Nov. 10, 1970    R. F. SCHMIDT    3,540,050
ELECTRONIC SCANNING OF 2-CHANNEL MONOPULSE PATTERNS
Filed June 25, 1969
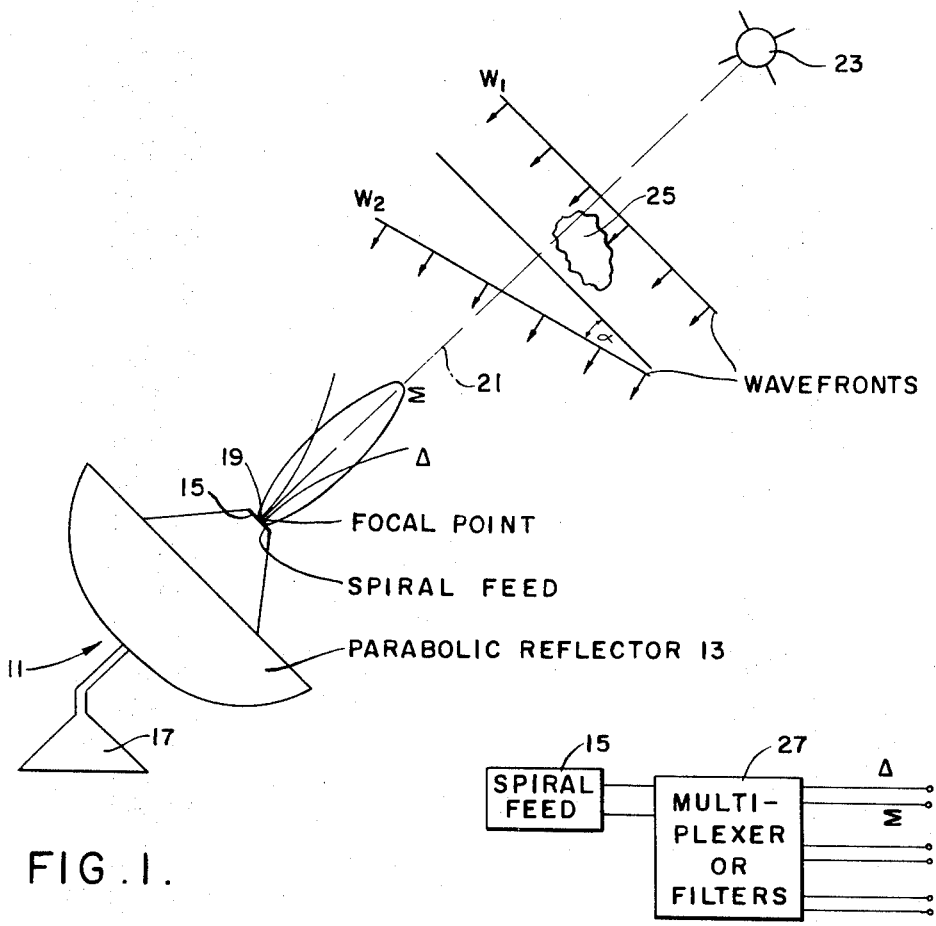
FIG. 1.
FIG. 2.
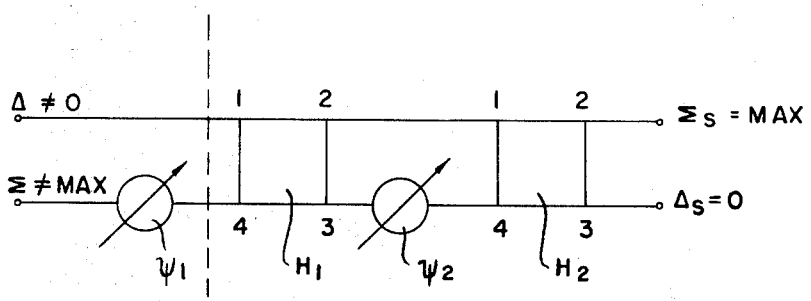
FIG. 3.
INVENTOR
Richard F. Schmidt
BY
ATTORNEYS

United States Patent Office 3,540,050
Patented Nov. 10, 1970

3,540,050
ELECTRONIC SCANNING OF 2-CHANNEL MONOPULSE PATTERNS
Richard F. Schmidt, Seabrook, Md., assignor to the United States of America as represented by the Administrator of the National Aeronautics and Space Administration
Filed June 25, 1969, Ser. No. 836,367
Int. Cl. H01q 3/26
U.S. Cl. 343—100          9 Claims

ABSTRACT OF THE DISCLOSURE

This disclosure describes a monopulse scanning network suitable for scanning a two-channel, three-dimensional volumetric antenna pattern, such as an equiangular spiral antenna pattern. The scanning network is formed of a phase shifter and a weighting circuit. The weighting circuit comprises a pair of 90-degree or quadrature hybrids and an intermediate phase shifter. The signals from the two channels are applied to the network and the phase shifter shifts one of the signals so that the relative phase difference between the two signals is reduced to zero or $\pi$ radians. The intermediate phase shifter is then adjusted to reduce one of the two channel signals to zero and increase the other to a maximum value.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Monopulse antenna systems are well known and widely used. They are used in radar systems for tracking an object as well as in data transmission systems for receiving information from an object, such as a space vehicle or an aircraft. One such monopulse system is known as a two-channel, three-dimensional system wherein a three-dimensional volume of space is scanned and two-channel signals are generated. The two-channel signals represent three specific quantities—the azimuthal angle of the target; the elevational angle of the target; and, the distance (in radar) from the target. In general, the signals from both channels are formed of two complex quantities—usually of unequal amplitude and arbitrary phase. In prior art systems, these two signals are utilized to control the mechanical movement of the antenna receiving the signals so as to align the boresight axis of the antenna with the object. When this occurs, the amplitude of one signal ($\Sigma$) is a maximum and the amplitude of the other signal ($\Delta$) is a minimum.

While prior art antenna control systems wherein alignment is achieved by the mechanical movement of an antenna have proven relatively satisfactory for small antennas, they are not satisfactory for large modern space data acquisition antennas or large modern radar tracking antennas. More specifically, antennas having 85-foot and greater diameters and weighing several tons have been developed for obtaining data from space vehicles and for tracking space vehicles and aircraft. Because of the size and weight of these antennas, the mechanical systems necessary to support and move them have become both bulky and complex. Even with modern, sophisticated servo techniques, it has become extremely difficult to mechanically maintain the boresight axis of these antennas aligned with the body being tracked. That is, as antennas have become bulkier and heavier, certain design problems have evolved. For example, minor antenna pointing changes of large acceleration cause mechanical vibrations which result in damage to large antennas, hence, minor antenna pointing changes are difficult to achieve. In addition, servo and hydraulic system specifications have become very exacting and are, therefore, difficult to achieve. Further, because of the difficulty in minutely changing the antenna boresight pointing direction, it is difficult to compensate for auroral and similar effects which cause slewing and deterioration of the received signal. Moreover, it is difficult to align the electrical and mechanical boresight axes of a particular antenna without precisely forming the antenna. Other, similar disadvantages are also present, all of which result in large antenna systems that are complex and demand high levels of performance from critically adjusted components. Such systems require frequent retuning and have inherently less than the desired reliability.

Therefore, it is an object of this invention to provide a new and improved system for use with a monopulse antenna which reduces the need for a highly accurate mechanical servo-control system.

It is another object of this invention to provide a system suitable for use with a two-channel monopulse tracking antenna that electronically scans the incoming signals, thereby eliminating the necessity for mechanically scanning by the antenna for small changes in the location of the object being tracked.

It is a further object of this invention to provide a new and improved apparatus for electronically scanning a two-channel, three-dimensional monopulse signal formed of sum ($\Sigma$) and difference ($\Delta$) components.

It is a still further object of this invention to provide an electronic scanning system suitable for scanning a two-channel, three-dimensional monopulse pattern that is suitable for use in combination with a mechanical system for aligning the boresight axis of an antenna with an object being tracked.

SUMMARY OF THE INVENTION

In accordance with a principle of this invention a monopulse scanning network suitable for scanning a two-channel three-dimensional volumetric antenna pattern, such as an equiangular spiral antenna pattern is provided. Two signals, one generated in each channel, are applied to the monopulse scanning network of the invention. The monopulse scanning network of the invention is formed of a phase shifter and a weighting circuit connected in a predetermined manner. The phase shifter is adjustable so that the relative phase between the two signals derived from the antenna can be reduced to zero or $\pi$ radians. The weighting circuit is also adjustable so that one or two outputs can be reduced to zero while the other output is increased to a maximum value.

In accordance with a further principle of this invention, the adjustment or setting of the first shifter is related to the azimuthal angle of the target from the boresight axis of the antenna and the adjustment or setting of the weighting circuit is related to the elevational angle of the target. In addition, the magnitude of the maximum output signal is related to information generated by or at the target. That is, the maximum output signal contains data from the target if the target is an information gathering spacecraft or aircraft, for example. Alternatively, the maximum output signal contains data about the target if the antenna is being utilized only as a tracking antenna.

In accordance with still further principle of this invention, the weighting circuit is formed of a pair of hybrids and a phase shifter connected between the two hybrids, the adjustment of the intermediate phase shifter being related to the elevational angle of the target from the boresight axis of the antenna.

It will be appreciated from the foregoing description that the invention provides an electronic scanning system suitable for use with a two-channel monopulse antenna system. The electronic monopulse scanning network scans by modifying the signals from the two channels so as to electronically align the boresight axis of the antenna with the target. By utilizing the invention with a conventional mechanical boresight aligning apparatus, the mechanical system will provide a coarse alignment while the electronic network of the invention will provide a fine or vernier alignment. Hence, the stringent prior art hydraulic and servo system requirements are greatly reduced. Moreover, other disadvantages, particularly with respect to minor target changes which have greatly aggravated the problems of prior art antennas, are eliminated or greatly reduced by the use of this invention.

BRIEF DESCRIPTION OF THE DRAWINGS

The foregoing objects and many of the attendant advantages of this invention kill become more readily appreciated as the same becomes better understood by reference to the following detailed description when taken in conjunction with the accompanying drawings, wherein:

FIG. 1 is a pictorial view of a receiving antenna including spiral and parabolic components;

FIG. 2 is a block diagram of a system for obtaining two-channel signals from a receiving antenna of the type illustrated in FIG. 1; and, FIG. 3 illustrates a preferred embodiment of the invention.

DESCRIPTION OF THE PREFERRED EMBODIMENT

FIG. 1 illustrates an antenna 11 having a parabolic reflector 13 and a spiral feed 15. The parabolic reflector 13 is attached to a suitable mount 17 and the spiral feed 15 fits inside of the parabolic portion so that the phase center of the spiral element coincides with the focal point 19 of the paraboloid. The foregoing structure is common and well-known in the antenna art.

A wavefront W1 originating at a target 23 such as a space vehicle or aircraft for example, moves toward the antenna system composed of the parabolic reflector 13, spiral feed 15 and mount 17. For purpose of illustration, the wavefront is illustrated as a straight line. It will be appreciated by those skilled in the art and others that the wavefront of a particular signal is essentially planar when it is an infinite distance from the point of origin of the signal. As illustrated in FIG. 1, the boresight axis 21 of the antenna 11 has been previously mechanically aligned with the target 23 so that the wavefront W1 is essentially at an angle of 90 degrees with respect to the boresight.

Located in front of the wavefront W1 in its path of travel, is an auroral or other similar phenomena 25. When the wavefront W1 intersects and passes through the auroral phenomena 25, it is shifted in direction. That is, the auroral phenomena delays a portion of the wavefront in some manner so that the main body of the wave is shifted by some angle $\alpha$. Hence the wavefront appears to the antenna 11 as being along line W2, illustrated in FIG. 1. It will be appreciated by those skilled in the art and others, that for ease of description W2 is also illustrated as a straight line because, while the auroral phenomena 25 actually shifts W2 into an irregular surface, the shifted line suffices to depict the wavefront angle-of-arrival viewed by the antenna 11.

Due to this angular shift, between W1 and W2 it is necessary that the boresight axis 21 be realigned so that the original 90 degree angular relationship exists with respect to the wavefront W2 or the maximum signal will not be detected by the electronic system connected to the antenna. While the antenna can be mechanically moved to achieve the new alignment, as described in the preamble to this specification, such mechanical movement is difficult to perform, particularly when the antenna is large and $\alpha$ is small. Moreover, the auroral phenomena may be shortlived, or fluctuate rapidly hence, the antenna will have to be returned to its original alignment after the auroral phenomena ceases to exist, or be redirected in accordance with the fluctuations. As hereinafter described, the invention overcomes this difficulty by electronically changing the boresight axis and, thereby, eliminating the necessity for mechanically moving the antenna.

Prior to describing the preferred embodiment of the invention, the system illustrated in FIG. 2 is described. FIG. 2 illustrates a situation wherein the antenna 11 receives a plurality of signals. These signals of different frequency could be derived simultaneously from a plurality of sources 23 located near one another, such as a plurality of sources on a spacecraft. Alternatively, the paraboloid with spiral feed could receive the different signals sequentially. In any event, when the spiral feed 15 receives a plurality of signals after the incoming wavefronts have interacted with the reflector surface its outputs are applied to a multiplexer or a plurality of filters 27. The multiplexer or filters 27 separates the spiral antenna's outputs into a plurality of two-channel signals illustrated as $f1$, $f2$, $f3$, etc. Each channel receives signals designated either sum ($\Sigma$) or difference ($\Delta$). In accordance with the invention, each signal pair is applied to an electronic scanning network of the type illustrated in FIG. 3 so that a maximum sum signal is obtained for each sum channel and a null is obtained for each difference channel.

FIG. 3 illustrates a preferred embodiment of an electronic scanning network formed in accordance with the invention. The embodiment of the invention illustrated in FIG. 3 comprises a phase shifting section illustrated on the left of the dashed line and a weighting section illustrated on the right of the dashed line. The leftmost phase shifting section comprises a first variable phase shifter designated $\psi 1$. The weighting section comprises: first and second square hybrids designated H1 and H2; (also known in the art as 90-degree or quadrature hybrids) and, a second variable phase shifter designated $\psi 2$. For purposes of description, the two square hybrids have their corners designated 1 through 4 starting at the upper left hand corner and moving in a clockwise direction.

A $\Delta$ input terminal which may be connected to the output of a multiplexer 27 as illustrated in FIG. 2 is connected to the 1 corner of H1. A $\Sigma$ input terminal is connected through the first variable phase shifter $\psi 1$ to the 4 corner of H1. Corner 2 of H1 is connected to corner 1 of H2 and corner 3 of H1 is connected through $\psi 2$ to corner 4 of H2. Corner 2 of H2 is connected to a sum output terminal designated $\Sigma_s$. Corner 3 of H2 is connected to a difference output terminal designated $\Delta_s$.

Turning now to a description of the theory of operation of the invention, dual-channel monopulse signals, such as those afforded by spiral antennas are unique in that the phase ($\psi$) of $\Delta$ relative to $\Sigma$ may take on any value—$\theta \leq \psi \leq 360$ degrees. The magnitude of $\Delta$, $/\Delta/$, relates to the elevation bearing $\theta$ and the phase of $\Delta$, relative to $\Sigma$ relates to the azimuth bearing $\phi$. Hence, by preceding a weighting circuit with a phase shifter, $\psi 1$, which continually removes the phase difference $\psi$ between the $\Delta$ and $\Sigma$ channels so that $\Delta$ and $\Sigma$ are in phase, or 180 degrees out of phase, then all the properties of a simple scanning circuit can be realized. That is, a scanning circuit can be provided that reduces $\Delta$ to zero while at the same time increasing $\Sigma$ to its maximum value. The invention provides such a circuit. The circuit can be easily calibrated so that the setting of the first phase shifter nearest the antenna ($\psi 1$) becomes a measure of the azimuth ($\phi$) displacement of a target from an azimuthal reference bearing (i.e. about boresight axis). The setting of the second phase shifter ($\psi 2$) of the weighting circuit then becomes a measure of the elevation ($\theta$) displacement of the target from the boresight reference axis. In short, this circuit scans the sum and difference patterns so that the sum is maximum and the difference is minimum. When this occurs, $\psi 1$ and $\psi 2$ provide data ($\phi$ and $\theta$) on the position of the target with respect to the boresight axis of the antenna.

It will be appreciated by those skilled in the art that the $\psi 1$ and $\psi 2$ information can be used in conjunction with suitable electronic circuits (not shown) to augment any existing mechanical antenna steering control system to provide an overall control system. In this manner the mechanical portion of the overall system can provide coarse alignment and the electronic system can provide vernier or fine alignment.

It will also be appreciated by those skilled in the art and others that the foregoing description has described an electronic scanning system suitable for use with a dual channel monopulse antenna. By electronically, as opposed to mechanically, scanning the antenna's pattern, many of the disadvantages of prior art systems which depend entirely on mechanical movement to provide a maximum output signal are eliminated or reduced. The invention provides information on the location of a target with respect to the boresight axis of the antenna as well as providing the maximum amount of information achievable from the incoming signals without physically moving the antenna from a rough or coarse alignment with the target. Hence, an antenna system utilizing the invention is not subject to the strict mechanical requirements of prior art systems that do not utilize the invention.

It will further be appreciated by those skilled in the art and others that only a preferred embodiment of the invention has been illustrated and described, and that various modifications may be made without departing from the scope of the invention. For example, the first phase shifter can vary the phase of $\Delta$ as opposed to varying the phase of $\Sigma$ since it is the relative phase between $\Sigma$ and $\Delta$ that must be modified to achieve the desired results. Consequently, the invention can be practiced otherwise than as specifically described herein.

What is claimed is:

1. A scanning network suitable for scanning a two-channel, three-dimensional volumetric antenna pattern comprising:
    an adjustable phase shifter connected so as to receive two-channel signals and reduce the relative phase difference between the two-channel signals to a predetermined radian value; and,
    an adjustable weighting circuit connected to said adjustable phase shifter so as to reduce one of said two-channel signals and increase the other of said two-channel signals.

2. A scanning network suitable for scanning a two-channel, three-dimensional volumetric antenna pattern as claimed in claim 1 wherein said adjustable weighting circuit includes a second adjustable phase shifter, the adjustment of said second adjustable phase shifter reducing one of said two-channel signals and increasing the other of said two-channel signals.

3. A scanning network suitable for scanning a two-channel, three-dimensional volumetric antenna pattern as claimed in claim 2 wherein said adjustable weighting circuit also includes a pair of hybrids, said second adjustable phase shifter being connected between said pair of hybrids.

4. A scanning network suitable for scanning a two-channel, three-dimensional volumetric antenna pattern as claimed in claim 3 wherein said hybrids are quadrature hybrids.

5. A scanning network suitable for scanning a two-channel, three-dimensional volumetric antenna pattern as claimed in claim 4 wherein said second adjustable phase shifter is adjusted to reduce one of said two-channel signals to zero and increase the other of said two-channel signals to a maximum value.

6. A scanning network suitable for scanning a two-channel, three-dimensional volumetric antenna pattern comprising:
    a first input terminal connected so as to receive a $\Delta$ signal;
    a second input terminal connected so as to receive a $\Sigma$ signal;
    a first adjustable phase shifter having one side connected to said second input terminal;
    a first quadrature hybrid having one corner connected to said first input terminal and a second corner connected to the other side of said first phase shifter;
    a second adjustable phase shifter having one side connected to one of the remaining corners of said first quadrature hybrid;
    and,
    a second quadrature hybrid having one corner connected to the remaining corner of said first quadrature hybrid and a second corner connected to the other side of said second adjustable phase shifter, the remaining two corners connected to $\Sigma$ and $\Delta$ output terminals.

7. A scanning network suitable for scanning a two-channel, three-dimensional volumetric antenna pattern as claimed in claim 6 wherein the adjustment of said first adjustable phase shifter is related to the azimuthal angle of the boresight axis of the antenna pattern and wherein the adjustment of the second phase shifter is related to the elevational angle of said boresight axis.

8. A scanning network suitable for scanning a two-channel, three-dimensional volumetric antenna pattern as claimed in claim 7 wherein said first phase shifter is adjusted so that the angle between the $\Sigma$ and $\Delta$ input signals is reduced to a predetermined radian value.

9. A scanning network suitable for scanning a two-channel, three-dimensional volumetric antenna pattern as claimed in claim 8 wherein the $\Sigma$ output is increased to a maximum value and the $\Delta$ output is decreased to a minimum value by the adjustment of said second phase shifter.

References Cited
UNITED STATES PATENTS

| | | | |
|---|---|---|---|
| 2,913,723 | 11/1959 | Thourel | 343—854 X |
| 3,175,217 | 3/1965 | Kaiser et al. | 343—113 |

RODNEY D. BENNETT, Primary Examiner

R. E. BERGER, Assistant Examiner

U.S. Cl. X.R.

343—854, 895